O. T. BUGG.
INNER TUBE FOR PNEUMATIC TIRES AND PROCESS OF MAKING THE SAME.
APPLICATION FILED JUNE 4, 1918.
1,329,954. Patented Feb. 3, 1920.
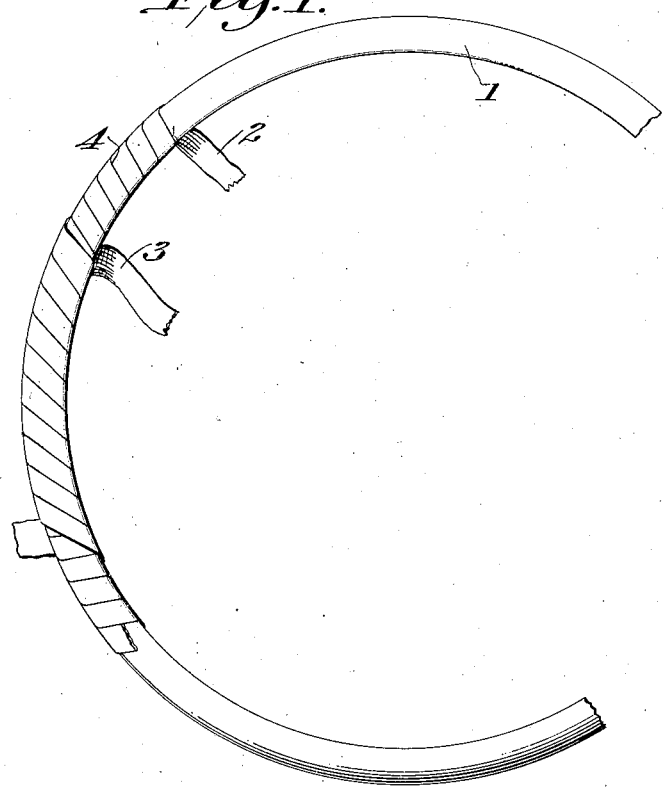
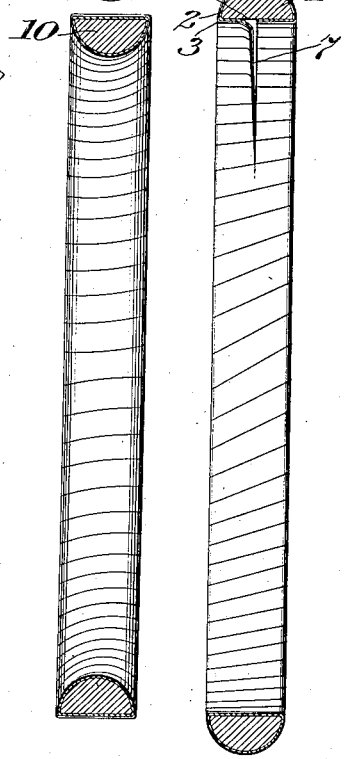
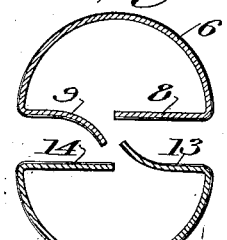
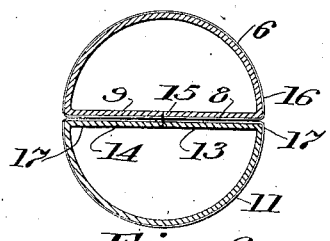
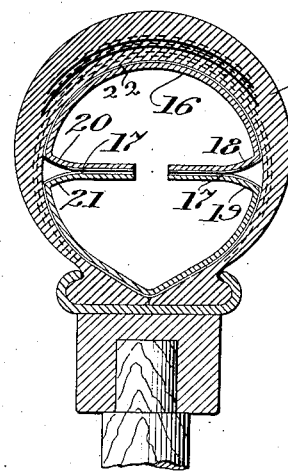
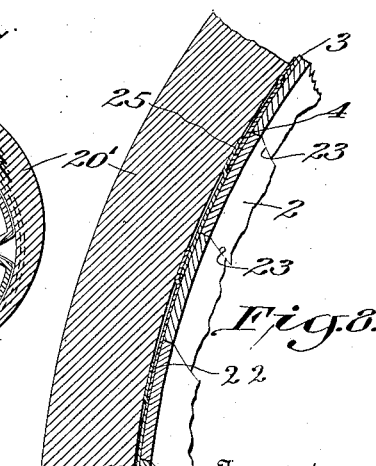
Inventor
O. T. Bugg
Attorney

UNITED STATES PATENT OFFICE.

OWEN T. BUGG, OF PHILADELPHIA, PENNSYLVANIA.

INNER TUBE FOR PNEUMATIC TIRES AND PROCESS OF MAKING THE SAME.

1,329,954.  Specification of Letters Patent.  Patented Feb. 3, 1920.

Application filed June 4, 1918. Serial No. 238,207.

*To all whom it may concern:*

Be it known that I, OWEN T. BUGG, a citizen of the United States, residing at Philadelphia, in the county of Philadelphia and State of Pennsylvania, have invented certain new and useful Improvements in Inner Tubes for Pneumatic Tires and Processes of Making the Same; and I do hereby declare the following to be a full, clear, and exact description of the invention, such as will enable others skilled in the art to which it appertains to make and use the same.

This invention relates to inner tubes for pneumatic tires made of cloth or other fabric, and has for its object to improve the tubes of this nature which have been heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views.

Figure 1 is a diagrammatic view illustrating a mandrel with a portion of an inner tube made in accordance with this invention wound thereon;

Fig. 2 is a sectional view of a mandrel showing one half of my inner tube wound thereon;

Fig. 3 is a view similar to Fig. 2, showing the other half of my tube wound thereon;

Fig. 4 illustrates the half tube made on the mandrel shown in Fig. 3, when detached from said mandrel;

Fig. 5 illustrates the half tube formed on the mandrel shown in Fig. 2, after having been detached therefrom;

Fig. 6 shows the half tube illustrated in Figs. 4 and 5 connected together to form a single complete inner tube;

Fig. 7 is a sectional view showing an ordinary tire with my inner tube in place therein; and Fig. 8 is an enlarged sectional view of a portion of the parts shown in Fig. 7.

1 indicates a mandrel of the semi-circular section shown, around which is helically wound one or more strips 2 of canvas or other suitable fabric material, and on the outside of said canvas strips 2 are wound the paper or other strips 3 in such a manner as to cover the joints 4 made by the canvas strips. It will be observed that the mandrel 1 is of ring shape, and that it has the inner flat surface 5 which causes the half tube 6, that is wound thereon, to be provided with a corresponding flat inner surface. Later when the said tube 6 is stripped from the mandrel 1, as by slitting the same, along the line 7, the flat surface of said tube is converted into the two flat surfaces 8 and 9 best illustrated in Fig. 4.

In the same way, there is wound on a similar but smaller ring like mandrel 10, the other half tube 11 which is likewise preferably made of helically wound strips of canvas and paper, and which when slitted, and stripped from its mandrel, is provided with the two flat surfaces 13 and 14, as best shown in Fig. 5.

The two half tubes 6 and 11 being thus formed on their respective mandrels 1 and 10, and stripped therefrom they are brought together as shown in Fig. 6, whereupon the flat surface 8 is cemented, glued or otherwise secured to the flat surface 13, and a flat surface 9 is similarly secured to the flat surface 14, leaving the joint 15 between the ends of said surfaces 8, 9, 13 and 14 free to be penetrated by the air contained within the finished tube 16 thus produced.

The glue or other cementing material is preferably not carried out to the circumference of the tube 16 but is stopped at some points such as 17 inside said circumference thus leaving a flexible portion of the front having the members 18 and 19 on one side of the tube, and the members 20 and 21 on the other side of said tube. The tube being thus formed it may be inserted into an outer casing 20', of any suitable construction, and inflated the same as any other tube.

When said completed tube 16 is thus brought into position and inflated, the yielding flexible surfaces or portions 18, 19, 20 and 21 will receive the air pressure, will yield thereto, and cause the outer surface 22 of said tube 16 to accommodate itself to the interior surface of the casing 20', and thus to resist all inward pressures and to form the resilient support so much desired in pneumatic tires.

The edges 23 of the individual strips 2 of canvas are preferably abutted, as best shown in Fig. 8, but of course, they may be overlapped as desired. The individual strips 3 of paper or other fibrous material may be of a single thickness or of a plurality of thicknesses as desired, and their edges preferably overlap each other, as best illustrated in Figs. 1 and 8.

The canvas strips 2 can be treated with any suitable material to render them more or less air tight, and I have found that a thin solution of pyroxylin adapted for this purpose, as well as a very thin solution of rubber which is comparatively inexpensive.

The strips of paper 3 may likewise be treated if desired in a similar manner, or instead of paper strips 3, I may employ thin closely woven fabric such as the well known cotton fabrics now on the market. But when fabric is substituted for paper, I treat it with a rather thicker solution of pyroxylin, cement, glue, or other material so as to render the same absolutely air tight. The paper strips 3 and canvas strips 2 are cemented together by any suitable and well known glue or other material, but such material is selected as will best withstand the heat which is generated on the surfaces between the inner tube and the outer casing.

When it is desired to repair the inner tube, as for example, after a puncture, I simply wrap paper or prepared fabric around the punctured part and glue the parts together as will be readily understood. From the foregoing, it will now be clear that by employing canvas or similar material, for the inner tube, I am enabled to utilize a comparatively inexpensive material possessed of great strength, and by covering the joints 4 with a material impervious to air, I am enabled to make this inexpensive and very stout tube air tight. On the other hand, as well known, it has not been possible prior to my invention to render inflexible or non-stretchable tubes of this character sufficiently resilient to accommodate themselves to the varying pressures and loads to which they are subjected and therefore they would burst under hard usage. In my invention, on the other hand, by providing the flexible portions 18, 19, 20 and 21, my tube is rendered flexible and is given a property which is the equivalent to a stretching quality so that it will accommodate itself to the highest pressures in a manner similar to a rubber inner tube. In addition to the above, it has been found almost impossible heretofore to helically wind a tube of this nature on a mandrel, to then strip it from the mandrel and to effectually close the joints rendered necessary by the stripping action.

On the other hand, by helically winding the inner tube in two halves as illustrated above, and providing the flat surfaces 8, 9, 13 and 14, which may be glued together, I am enabled to effectually close the joint in such a way that an internal rupturing pressure is not brought thereon, to any very great extent, and therefore, my joint remains perfectly tight no matter how hard its usage may be.

It will thus be seen that although my inner tube is made of relatively inflexible material such as canvas yet at the same time, it is possessed of substantially all of the useful properties that a rubber inner tube would have.

It is obvious that those skilled in the art may vary the details of the construction as well as the arrangement of parts without departing from the spirit of the invention, and therefore, I do not wish to be limited to the above disclosure except as may be required by the claims.

What I claim is:—

1. An inner tube for pneumatic tires comprising an outer member half round in cross section made from helically wound strips of fabric covered with material impervious to the air; and also comprising an inner member half round in cross section also made from helically wound strips of cotton fabric and covered with a material impervious to the air, said outer and inner members being secured together on a common cross sectional diameter having readily yieldable portions at each end of said diameter, substantially as described.

2. The process of making an inner tube for pneumatic tires which consists in helically winding an outer member of said tube on a ring like mandrel half round in cross section; slitting the outer member thus formed on its flat side and stripping it from said mandrel; helically winding an inner member on a ring like mandrel also half round in cross section; slitting said inner member on its flat side and stripping it from its mandrel; and securing together the corresponding flat sides of said outer and inner members to form a completed inner tube, substantially as described.

In testimony whereof I affix my signature, in presence of two witnesses.

OWEN T. BUGG.

Witnesses:
W. J. LADBEIR,
FUENTES PHIPPS.